United States Patent [19]

Demarest

[11] 3,848,175
[45] Nov. 12, 1974

[54] STARTING INHIBIT SCHEME FOR AN HVDC CONVERTER

[75] Inventor: Donald M. Demarest, Wallingford, Pa.

[73] Assignee: General Electric Company, Philadelphia, Pa.

[22] Filed: Oct. 24, 1973

[21] Appl. No.: 409,210

[52] U.S. Cl.................. 321/11, 321/13, 321/14, 321/19, 321/40
[51] Int. Cl. ............................................ H02h 7/14
[58] Field of Search .................. 321/5, 11–14, 321/19, 27 R, 32, 38, 40, 42, 47

[56] References Cited
UNITED STATES PATENTS

| | | | |
|---|---|---|---|
| 3,466,525 | 9/1969 | Ainsworth............................. | 321/13 |
| 3,573,603 | 4/1971 | Anderson.............................. | 321/12 |
| 3,648,147 | 3/1972 | Leete..................................... | 321/5 |
| 3,701,938 | 10/1972 | Chadwick............................. | 321/11 |

OTHER PUBLICATIONS
(S0200-0002) Ekstrom et al., "A Refined HVDC Control System," IEEE Transactional; Vol. Pas-89, No. 5/6, pp. 723–732, May/June 70.

*Primary Examiner*—William H. Beha, Jr.
*Attorney, Agent, or Firm*—Albert S. Richardson, Jr.; J. Wesley Haubner

[57] ABSTRACT

A high-voltage converter comprises a plurality of electric valves interconnected in a bridge configuration between a-c and d-c electric power conductors and means for cyclically firing the valves in a normal sequence. To stop the converter its firing means is blocked, and for subsequently restarting the converter, starting means is operative to disable the blocking means. Means is provided for inhibiting such operation of the starting means if the magnitude of voltage across the a-c conductors is under a predetermined limit or if the magnitude of current in the d-c conductors is over a predetermined limit, thereby avoiding restarts under conditions which are likely to result in an immediate commutation failure.

20 Claims, 3 Drawing Figures

STARTING INHIBIT SCHEME FOR AN HVDC CONVERTER

This invention relates generally to the starting or restarting of an electric power converter, and more particularly it relates to a scheme for supervising the starting of a line-voltage commutated converter of the kind that can be operated alternatively as either a rectifier (converting a-c to d-c) or an inverter (converting d-c or a-c) in a high voltage direct current electric power delivery system.

A static power converter suitable for HVDC power delivery systems comprises the combination of a polyphase power transformer and at least one group of six interconnected electric current conducting valves. Each of the valves can be a single mercury arc tube, or a plurality of semiconductor cells such as thyristors that are operated in unison. Typically the valves are arranged in 3-phase double-way 6-pulse bridge configurations having three separate a-c terminals and a pair of positive and negative d-c terminals. By sequentially firing the respective valves in the proper order and in synchronism with the sinusoidal alternating voltage of the 3-phase electric power network to which the a-c terminals of the bridge are connected, the flow of power between the a-c and d-c terminals can be controlled as desired.

The time at which a valve is fired, measured in electrical degrees from a recurrent reference point in each cycle of the associated voltage, is known as the "firing angle." It can be expressed either as an angle of delay ("alpha") after the positive-going zero crossing of the anode voltage of the valve, or as the complementary angle of advance ("beta") prior to the cyclically recurring instant at which the anode voltage waveform would have crossed zero and gone negative relative to the cathode if the valve had not been fired. Hereinafter the firing angle will be referenced to the latter instance, it being understood that a beta of $\beta$ degrees corresponds to a delay angle of $180° - \beta$. When beta is $180°$ (alpha = 0), the average magnitude of the rectified voltage between the d-c terminals of the converter has its maximum positive level, and the converter is able to deliver power from the a-c network to a load on its d-c side. As beta is decreased from $180°$ to approximately $90°$, the average d-c voltage decreases to zero. For betas in the range of $90°$ to zero, the average d-c voltage reverses polarity (i.e., the potential on the nominal positive terminal is relatively negative), and the bridge operates in its inverting mode whereby power can be transmitted from a source on the d-c side of the converter to the a-c network.

To fire an individual valve, its control grid or gate has to be activated by an appropriate trigger signal or gate pulse which is periodically applied thereto. A converter will therefore include suitable means for cyclically producing a series of gate pulses to fire the respective valves in proper sequence and at the desired firing angle. Ordinarily the control means comprises a firing signal generator whose operation determines the timing of the gate pulses and hence the firing angle of the respective valve firings. The firing signal generator performs the function of a firing time computer. The firing angle can be varied within a permissible range as a function of a variable control signal. An improved form of firing means well suited for an HVDC converter is disclosed in a copending U.S. Pat. application Ser. No. 382,015 filed for E. M. Pollard on July 23, 1973, and assigned to the General Electric Co.

Once a valve has been fired, it will conduct forward current until a companion valve in the same half of the bridge is fired one-third of a cycle later, whereupon that current is commutated to the latter valve. "Commutation" is the name given the periodic transfer of direct current from one valve (the relieved or outgoing valve) to the next-fired valve (the relieving or incoming valve). During a period of commutation, also known as the commutation or overlap angle ($\gamma$), the voltage on the a-c lines to the bridge causes current to rise from zero to full-load in the incoming valve and to fall from full-load to zero in the outgoing valve. While both valves are thus conducting, two phases of the a-c system are effectively short-circuited, and current in this short circuit is limited principally by the a-c system and leakage inductances (L). The interval that remains from the time conduction ceases through the outgoing valve to the instant when that valve again has to withstand a reapplied forward voltage is known as the extinction or margin angle ($\delta$). Thus $\beta = \gamma + \delta$.

As is explained in chapter 3 of the textbook entitled "High Voltage Direct Current Power Transmission" by C. Adamson and N. G. Hingorani (Garraway Ltd., London, 1960), there is a known relationship between the magnitude of the current being commutated ($I_d$), the RMS voltage (E) between a-c terminals of the bridge, and the above-mentioned angles. For an inverter this relationship can be expressed by the commutation equation:

$$I_d = E / \sqrt{2} \omega L \ (\cos[\beta - \gamma] - \cos \beta).$$

For safe operation, the firing angle $\beta$ of an inverter must be sufficiently advanced so that the actual margin angle ($\beta - \gamma$) is longer than a certain critical time determined by the recovery characteristics of the valves plus an allowance for normal perturbations of the a-c system. If the margin angle were too small, a valve that has just ceased conducting current will prematurely break down and conduct again as soon as its forward voltage is reapplied. This is known in the art as a commutation failure. A commutation failure can result from an untoward reduction in alternating voltage or from an abnormal increase in direct current. Such disturbances may be caused by faults of the kinds that are reviewed in chapter 6 of the Adamson and Hingorani text. In the same chapter these authors explain that an inverter has the capability of automatically recovering from a commutation failure, although to cure a persistent failure it may be necessary temporarily to block the inverter (i.e., to suspend the normal valve firings) and to turn on an auxiliary valve which is connected across the d-c terminals of the bridge so as to bypass the bridge and thereby relieve the working valves from overload. In this event, after the bypass valve has been conducting for a certain interval of time, a normal sequence of firing is resumed with $\beta$ advanced to an angle exceeding $60°$. As is taught in U.S. Pat. No. 2,532,108, it is possible to arrange the controls to respond to a commutation failure by firing out of turn the valve opposite to the unduly conducting valve, thereby forming a bypass pair of valves in the bridge itself and eliminating the need for an auxiliary valve to perform the bypass function.

Where ionic tubes are used as the working valves of an HVDC converter, it has heretofore been the practice in this art to allow a temporary bypass condition to continue for a fixed interval of the order of 200 to 800 milliseconds, and to automatically restart the inverter at the end of this interval. Such an interval is necessary to permit ionic tubes to restabilize after a persistent commutation failure, but it is longer than the time that the a-c system ordinarily requires to recover from the disturbance that caused the commutation failure in the first place. The bypass interval can be reduced where ionic tubes are replaced by solid-state valves using semiconductor cells which need no time for restabilizing and which have a very short thermal time constant.

In practice there are a number of different reasons for temporarily blocking a converter. For example, to protect the converter in the event of a fault, a loss of alternating voltage, or a prolonged overload or other serious malfunction, it may be necessary to shut down until the disturbance has dissipated. If an inverter were restarted too soon after being shut down or stopped for any reason, its ability to commutate may be in jeopardy. Recurring restarts and commutation failures can cause excessive electrical stress of the valves and of the snubber circuits which are customarily associated therewith. Furthermore, abortive attempts to restart will undesirably dissipate the gate pulse forming energy stored in the gate drives of the individual valves and will unduly load the a-c system with lagging VARs. As a result, system recovery may be impeded, and the converter's eventual return to normal operation will be unnecessarily delayed.

Accordingly, a general objective of the present invention is to provide, for restarting an electric power converter, an improved scheme which is effective to permit an early and safe restart after a temporary stop during which normal firing of the converter valves has been blocked.

A further object of my invention is to provide a means and a method that will minimize the risk of commutation failure when a converter is started or restarted after a protective shutdown.

In carrying out my invention in one form, a set of polyphase alternating voltage electric power conductors and a pair of direct current conductors are interconnected by a static converter comprising a plurality of controllable electric valves and means for cyclically firing the valves in a predetermined normal sequence and at a firing angle that can vary within a permissible range as a function of a variable control signal. When the converter is running, the sequential firing of its valves causes the direct current to be periodically commutated from one valve to another, and each valve in its turn normally conducts current for a predetermined interval during each cycle of alternating voltage. Normal operation of the converter can be stopped when desired by blocking means which causes the firing signal generator to idle, in which state the cyclic valve firings are suspended. Starting means is connected to the blocking means and is operative in response to certain conditions (including the execution of a run order) for disabling the blocking means and thereby allowing the firing means to start or to restart the converter. In order to avoid restarting when an attempt to commutate might be detrimental to the alternating voltage system or when conditions are such that a commutation failure might immediately occur, I provide means for inhibiting operation of the starting means if the magnitude of alternating voltage is under a predetermined minimum limit or if the magnitude of direct current is over a predetermined maximum limit. Preferably the inhibiting means is also arranged to calculate the commutating ability of the converter while the firing signal generator is idling and to prevent operation of the starting means if the calculated commutating ability is insufficient to ensure successful commutation once the converter is running. By using this scheme, the duration of a temporary stop can be kept relatively short, and restarting is thereafter delayed only if and to the extent necessary to ensure that the converter has adequate ability to commutate when unblocked.

My invention will be better understood and its various objects and advantages will be more fully appreciated from the following description taken in conjunction with the accompanying drawings in which.

Figure 1:
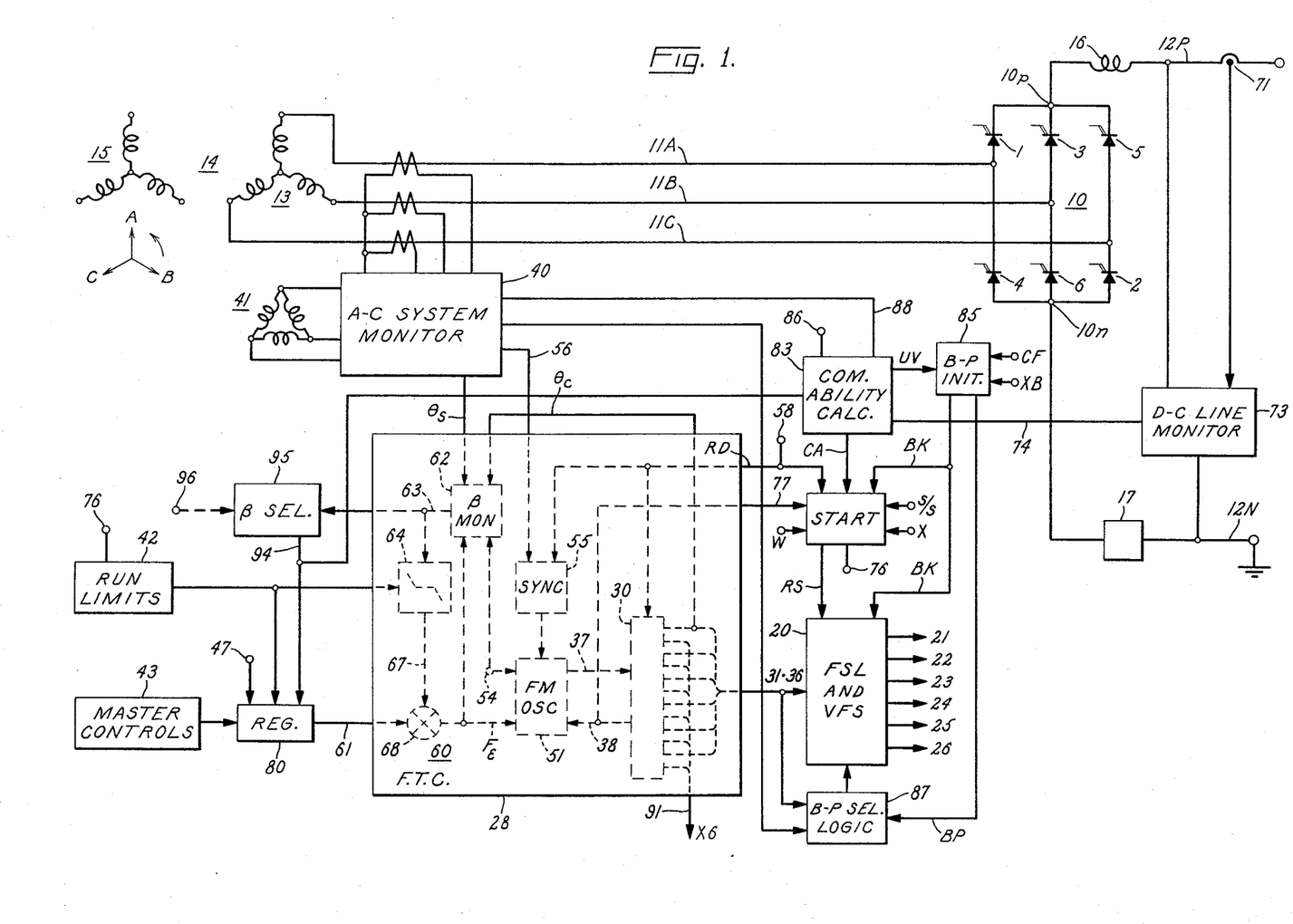
FIG. 1 is a functional block diagram of a static power converter including restarting controls which embody my invention.

Referring now to FIG. 1, the illustrated converter is seen to comprise a group of six periodically conducting controllable electric valves 1, 2, 3, 4, 5, and 6 which are interconnected and arranged to form a 6-pulse bridge 10 between a set of three separate a-c power conductors 11A, 11B, and 11C and a set of two d-c power conductors 12P and 12N. The a-c conductors are in turn connected to a set 13 of star-connected secondary windings of a main power transformer 14 whose 3-phase primary 15 is adapted to be connected to the respective phases of a polyphase a-c electric power network (not shown) whose phase rotation is A, B, C. The odd-numbered valves 1, 3, and 5 have their cathodes connected in common to a nominal positive terminal $10p$ of the bridge and their anodes connected respectively to conductors 11A, 11B, and 11C, while the even-numbered valves 4, 6, and 2 have their anodes connected in common to a nominal negative terminal $10n$ and their cathodes connected respectively to conductors 11A, 11B, and 11C.

The positive terminal $10p$ of the bridge 10 is connected to the first d-c conductor 12P by way of a conventional current smoothing reactor or choke 16. The negative terminal $10n$ is connected to the other d-c conductor 12N either directly or, more commonly, via the d-c terminals of at least one additional 6-pulse bridge connected in series with the bridge 10. In FIG. 1 the block 17 represents the companion bridges, and it will be understood that their a-c terminals are ordinarily connected to separate power transformers or to additional sets of 3-phase secondary windings inductively coupled to the primary 15 of the illustrated transformer 14. To form a 12-pulse converter, for example, a total of two bridges and two sets of secondary windings can be used, with the second set having its windings connected in delta so that its voltages are displaced in phase by 30 electrical degrees from the voltages on conductors 11A, 11B, and 11C respectively.

The converter that is shown in FIG. 1 is intended to be part of one pole of a terminal or station of a power delivery system which can transmit high voltage direct current (HVDC) over the conductors 12P and 12N between the a-c network to which the transformer primary 15 is connected and another network to which the remote ends of these d-c conductors are coupled. Ordinarily there is another converter terminal (not shown) located between the remote end of the d-c link and the other a-c network. In this setting each of the six controlled valves in each bridge of the system must necessarily be capable of periodically blocking high voltages and conducting high currents. Toward that end, each valve preferably comprises a series string of parallel arrays of individual thyristors which are suitably arranged for switching and conducting effectively in unison. See for example U.S. Pat. No. 3,423,664—Dewey. Each of the constituent thyristors of a valve has its own gating means, and in order to turn on or to fire the valve suitable means is provided for simultaneously activating the gating means of all of its thyristors in response to a trigger signal being applied to the valve by associated controls.

The control means for the bridge 10 includes a valve firing system 20 which repetitively produces a series of appropriate trigger signals 21–26 and which sequentially applies these signals to the six valves 1–6 in numbered order. In FIG. 1 the valve firing system 20 is illustrated as a single block that also includes a firing signal logic function which will be further described hereinafter. The valve firing system 20 is suitably designed to produce the trigger signals 21–26 in turn when activated by periodic output signals of a firing time computer 28. The firing time computer 28, during each cycle of the transformer secondary voltages, generates and distributes to the valve firing system a family of six staggered output pulses 31–36 (herein referred to as firing signals). The individual firing signals respectively commence at intervals of 60 electrical degrees, and it is their timing relative to the zero crossings of the alternating voltages on the conductors 11A, 11B, and 11C that determines the firing angle of the valves 1–6. By varying this firing angle, the direction and amount of power flowing between the a-c and the d-c conductors can be controlled in a known manner.

The firing time computer 28 is suitably constructed and arranged to vary within prescribed limits, the timing of the family of individual firing signals relative to the zero crossings of the alternating voltages so that the actual direction and quantity of power will conform to a given power order. Toward this end, operation of the firing time computer 28 is affected by several interdependent inputs. As is shown in FIG. 1, one of the inputs is a periodic feedback signal $\theta_c$ which marks the initiation of successive valve firings in the bridge 10. Another input is a periodic reference signal $\theta_s$ which is synchronized with the fundamental sinusoidal voltage waveform of the power system. This reference signal is derived from the a-c network by means of an a-c system monitor 40 which is coupled to the power conductors 11A, 11B and 11C by suitable means such as tertiary windings 41 of the main 3-phase power transformer 14. Other inputs to the firing time computer are supplied by a block 42 labeled "run limits" and by a regulator 80 which in turn receives power orders from the master controls 43 and system responses from a feedback terminal 47. It should be noted that in a 12-pulse converter the companion bridge 17 can either share the same firing time computer with the bridge 10 (as is further explained below) or have its own separate controls, in which case the firing time computer is associated with the two bridges could be suitably arranged to operate either independently or in concert with one another.

As it is shown in FIG. 1, the firing time computer 28 comprises a voltage-controlled oscillator 51 for producing a train 37 of relatively high frequency pulses and a distributor 30. The pulse frequency of the train 37 is controlled by a variable bipolar input signal $F_\epsilon$ which is derived from a bipolar input signal 61 whose source is the regulator 80. As is more fully disclosed in the above-mentioned Pollard application, the oscillator 51 includes a frequency modulated clock whose operating frequency varies with the magnitude of a frequency determining voltage comprising the algebraic sum of the control signal $F_\epsilon$ and a bias signal $F_b$ of preselected magnitude. The latter signal, which is taken from a terminal 54, is appropriately dimensioned to cause the oscillator to run at a predetermined harmonic (e.g., twelfth) of the normal fundamental frequency (e.g., 60 Hz) of the alternating voltage of the a-c network so long as the control signal is zero. In steady state operation the oscillator produces a train of equidistant, discrete pulses whose frequency is a predetermined multiple of the a-c system frequency. The distributor 30 responds to alternate pulses in this train by sequentially issuing at 60° intervals the periodic firing signals 31–36 which activate in turn the previously described valve firing system 20. In a 12-pulse converter the distributor can also generate a second family 91 of six firing signals, phase displaced by 30° with respect to the family 31–36, and the second family is fed to a valve firing system (not shown) for the companion bridge 17.

Each of the firing signals produced by the firing time computer is a square-wave pulse of 180° duration. Concurrently with the commencement of each firing signal, the distributor 30 issues a feedback pulse 38 which resets or clears the clock in the voltage-controlled oscillator 51, whereupon the oscillator immediately starts its next cycle of operation. Sixty degrees after initiating the sixth firing signal in the family 31–36, the distributor repeats the first firing signal 31. For starting the firing time computer after it has been out of service for any reason, there is associated with the oscillator 51 suitable synchronizing means 55 which ensures that the initial firing signal to be generated is properly timed in relation to the anode voltage of the corresponding valve. Inputs to the synchronizing means comprise a timing signal 56 which the a-c system monitor 40 periodically supplies and a predetermined start command (RD) supplied by external controls to a terminal 58. The start command also supervises operation of the distributor 30. For additional information about the oscillator starting means, see copending U.S. Pat. application Ser. No. 383,899 filed for E. M. Pollard on July 30, 1973, and assigned to the General Electric Co.

In normal operation of the firing time computer 28, the timing of the start of each firing signal is characterized by the electrical angle $\beta$ which is referenced to the negative-going zero crossing of the phase-to-phase voltage that forward biases the associated valve just prior to its firing (which voltage is also known as the commutating voltage of the valve whose conduction will be relieved upon firing the valve associated with that firing signal). Under steady state conditions the control signal $F_\epsilon$ has a normal value (e.g., zero) that keeps the frequency of each of the firing signals 31–36 in agreement with the fundamental frequency of the alternating voltage of the a-c network, and consequently the magnitude of $\beta$ is then constant. If the magnitude of $F_\epsilon$ were transiently changed in a positive or negative sense from normal, the firing signal frequency would be raised or lowered relative to the a-c frequency, thereby advancing or retarding $\beta$ at a rate that depends on the amount of frequency difference.

The control signal $F_\epsilon$ is derived from the input signal 61 by means 60 which comprises a beta monitor 62 for producing an angle feedback signal 63 whose magnitude is representative of $\beta$, an overriding clamp 64 for comparing the angle feedback signal 63 with preset minimum and maximum limits, respectively, and for supplying a limit signal 67 proportional in magnitude to the amount of any deviation of $\beta$ outside a range of permissible variations that these limits establish, and means 68 for algebraically summing the input signal 61 and the limit signal 67. The output of the summing means 68 is representative of the sum of the signals 61 and 67 and is the control signal $F_\epsilon$.

Preferably the beta monitor 62 used in the illustrated firing time computer 28 is suitably constructed and arranged to produce an angle feedback signal whose magnitude varies with the predicted magnitude of $\beta$ for each consecutive firing signal that will in turn effect the next valve firing in numerical sequence. A monitor that is well suited for this purpose is disclosed and claimed in copending U.S. Pat. application Ser. No. 382,016 filed for E. M. Pollard on July 23, 1973, and assigned to the General Electric Co. Such a monitor utilizes the inputs indicated schematically in FIG. 1 and responds thereto with both high steady-state accuracy and fast transient response to produce an angle feedback signal 63 having relatively negative polarity and a magnitude that is a measure of $\beta$. The clamp 64 will influence the control signal $F_\epsilon$ as a function of any deviation of this angle feedback signal beyond the respective maximum and minimum limits, and as a result the frequency of the pulse train 37 is varied as necessary to minimize the excursion of $\beta$ outside its permissible range. The preset maximum and minimum limits of $\beta$ are determined by the external run limits 42, and they may be varied or adjusted under certain system conditions. So long as $\beta$ is within its range of permissible variations, the value of $F_\epsilon$ will vary with the value of the bipolar variable input signal 61, and hence the latter signal controls the valve firing angle.

The input signal 61 is supplied by the regulator 80 which is suitably constructed and arranged so as to vary this signal in accordance with the difference between actual and desired magnitudes of a selected system quantity. In one advantageous mode of regulation, as is taught in the first-mentioned Pollard application, the quantity selected is $\beta$ which is regulated to a desired constant value established by either the maximum or the minimum limit thereof. To provide an indication of the actual value of $\beta$, the regulator 80 is supplied with a response or feedback signal 94 having a typical value determined by a beta selector 95 from among a plurality of firing angle feedback signals including the signal 63 produced by the beta monitor 62 and other signals which are supplied to a terminal 96 by redundant beta monitors (not shown).

The $\beta$ mode of regulation is used when the converter is not running, that is, when the firing signal logic is effective to block activation of the valve firing system 20 by the firing signals 31–36 so that no valve firings are taking place and the firing time computer is idling. At this time, according to the converter starting scheme that is disclosed and claimed in U.S. Pat. No. 3,648,147-Leete, the firing time computer is preconditioned to establish a desired value of range of values for the initial firing angle (e.g., $\beta = 125°$ or $130°$ on an operating basis). This result can be obtained by including in the run limits 42 suitable bias means (not shown) for appropriately decreasing the maximum limit of $\beta$ before the converter is started. Such bias means is actuated by a signal received from starting or recycling means 75 to which the bias means is coupled via a terminal 76.

Figure 2:
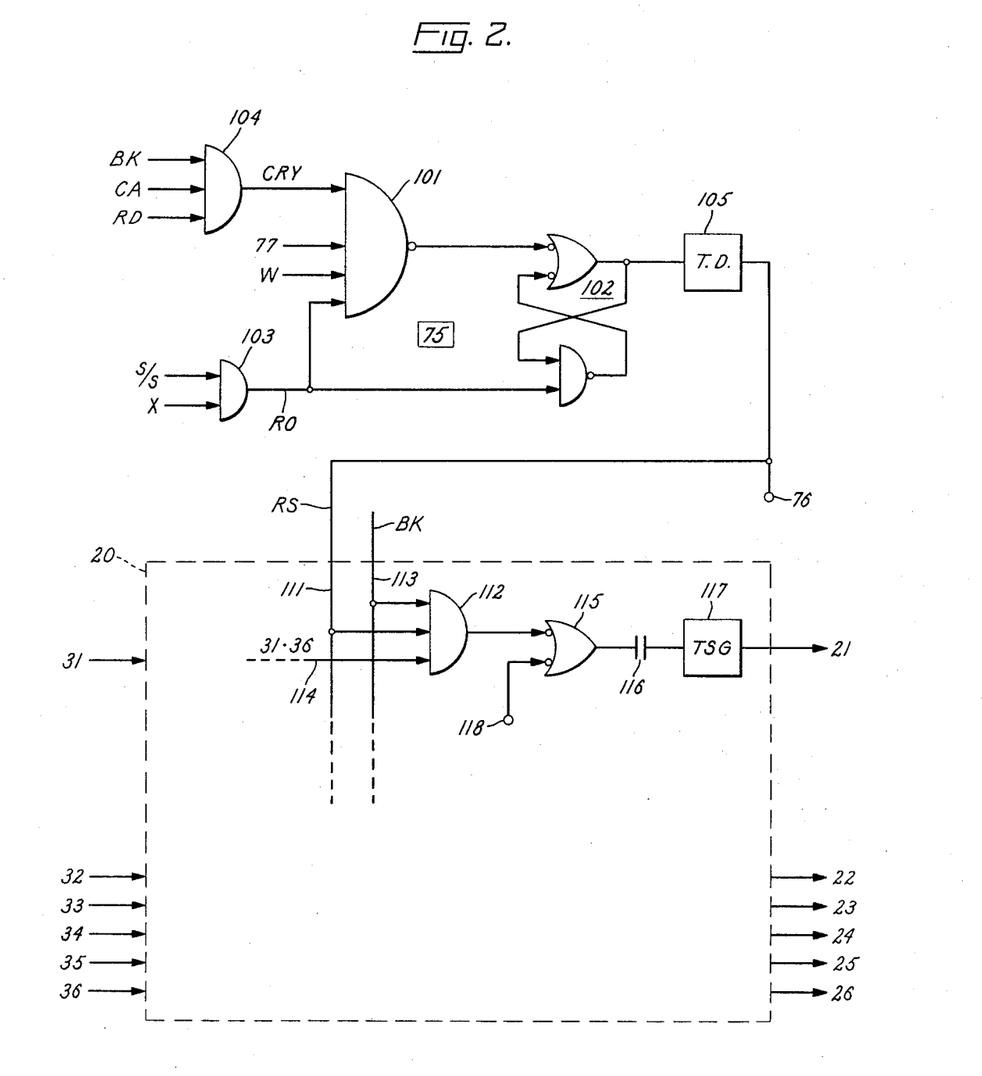
FIG. 2 is a schematic circuit diagram of preferred embodiments of the starting means and the blocking means shown in block form in FIG. 1.

As is best seen in FIG. 2, the converter starting means 75 includes a NAND logic unit 101 in combination with a solid-state latching switch 102. This combination produces a run signal RS in response to certain conditions as reflected by a variety of inputs to the unit 101. A first input RO, which is also fed to the latching switch 102, is a run order from a start-stop latch 103. The latch 103 in turn receives a signal S/S from the master controls and a signal X from associated protective functions — the former signal (S/S) is switched from its low or 0 state to a high or 1 state when converter starting is desired and from 1 to 0 when a stop command is given; the latter signal (X) is normally in its 1 state from which it is switched to 0 if a serious overload or fault is detected. Whenever both S/S and X are 1, the run order RO is in a 1 state, and otherwise there is no run order (RO = 0).

The second input to the logic unit 101 shown in FIG. 2 is a periodic 1 pulse 77 which coincides with each of the feedback pulses 38 from the distributor 30 in the firing time computer 28 (FIG. 1). Thus this input comprises a train of pulses 77 which mark the leading edges of successive firing signals, and consequently the timing thereof is characterized by an angle $\beta$ of predetermined value. The third input to the unit 101 is a permissive signal W which is in a 1 state except in the event of certain conditions under which it is unwise to start the converter (e.g., regulator not ready, $\beta$ bias not available, or inadequate energy stored in gate drives of the individual valves).

The fourth input to the NAND unit 101 is received from an AND logic unit 104 and is designated an inhibit signal CRY. This signal is in a high or 1 state only when the converter is ready to run as indicated by the contemperaneous 1 states of the several signals RD, CA, and BK which are supplied to the unit 104. The signal RD is the previously mentioned oscillator starting command. It is taken from the terminal 58 (FIG. 1) and is in a 1 state whenever the converter controls are properly energized by d-c supply voltage, the a-c system monitors are functioning correctly, and sufficient redundant circuits and components are in working order to form a viable system. As will soon be more fully explained in connection with the description of FIG. 3, the signal CA is supplied by a commutating ability calculating means 83 and is in a 1 state except when there is insufficient commutating ability. The signal BK is supplied by a bypass initiating means 85 (FIG. 1) and is in a 1 state in the absence of a temporary bypass order.

In the converter starting means 75 the run order RO is executed when there is a coincidence of 1 states of all of the inputs to the NAND logic unit 101. In response thereto, the starting means is operative to produce the run signal RS. Preferably a time delay circuit 105 is inserted in the output of the latching switch 102 to introduce a slight delay (e.g., 20 microseconds) in the production of the run signal. Once produced this signal will continue in its 1 state until the latching switch is subsequently reset as a result of the run order RO reverting to a 0 state.

The run signal RS from the starting means 75 is supplied to the firing signal logic portion of the valve firing system 20 where it energizes an input bus 111 which feeds blocking means comprising an array of six AND logic gates. In FIG. 2 one of these logic gates 112 has been shown by way of example. It has three inputs which are respectively connected to the bus 111, to a second bus 113, and to an individual lead 114. The second bus 113 is energized by the previously mentioned signal BK which is in a 1 state so long as there is no temporary bypass order. Preferably the lead 114 is energized during each cycle of alternating voltage only for the period that the firing signals 31 and 36 overlap one another. It will now be apparent that if both RS and BK are 1, the gate 112 is able to produce at its output a periodic control signal which coincides with the first 120° of th firing signal 31. This control signal is inverted and passed through an OR circuit 115 to a differentiating capacitor 116 which, in response to the leading edge of the control signal, generates a short pulse to activate suitable means 117 in the valve firing system for generating the trigger signal 21 that fires the first valve 1 of the bridge 10. Similar firing channels comprising components which are duplicates of those shown at 112, 115, 116, and 117 are provided for generating the individual trigger signals 22–26 for each of the other five valves in the same bridge, and the two buses 111 and 113 are common to all six channels.

Prior to starting the converter, the run order RO is 0, there is no run signal (RS = 0), the input bus 111 is deenergized, and consequently the gate 112 will block activation of the trigger signal generator 117 even though the requisite firing signals are being periodically produced by the firing time computer. It is only after this blocking or idle causing effect has been disabled by receipt of the run signal RS from the starting means 75 that the gates 112 in all of the firing channels are released, thereby permitting the respective firing signals 31–36 to activate the corresponding generators 117 in their normal sequence.

To illustrate a typical starting operation, assume that a starting signal (S/S = 1) is produced just prior to the time when the firing signal 31 is due to commence and that each of the signals CRY, W, and X is then 1. As soon as the next pulse 77 is received from the firing time computer, the NAND unit 101 sets the latching switch 102 which, after a slight delay, produces the run signal RS, thereby energizing the bus 111 so as to disable the initial blocking effect of the gate 112. At the same time, the firing signal 31 commences and all of the inputs to the gate 112 are now 1. Consequently, at the output of this gate there immediately appears a 1 control signal to which the generator 117 responds by producing a trigger signal 21 for the corresponding valve 1. Simultaneously with the action just described, a 1 control signal appears at the output of the gate fed by the coexisting firing signals 36 and 35, and consequently there is also generated a trigger signal 26 for the valve 6. Valve 6 precedes valve 1 in the normal firing sequence, and the initial simultaneous firing of both of these valves enables the converter to start in accordance with the teachings of the above-referenced Leete patent.

Once the converter is running, there is a possibility that a commutation failure may develop. If such a failure persists, it is desirable temporarily to block normal operation of the converter and to turn on a bypass pair of valves for a short interval of time. In order temporarily to suspend the normal sequence of valve firings, the signal BK is switched to a 0 state, thereby deenergizing the bus 113 in the firing signal logic circuitry shown in FIG. 2. In order to fire whichever valve or pair of valves is necessary to form the bypass pair, an appropriate signal is applied to a terminal 118 of the inverting OR circuit 115 in the firing channel of each of the selected valves. The selection of the bypass pair of valves is made by a logic circuit 87 shown in block form in FIG. 1. This circuit receives inputs from the a-c system monitor 40 indicating voltages and currents of the a-c conductors 11A, 11B, and 11C, and it receives inputs from the firing time computer 28 corresponding to the firing signals 31–36. The circuit 87 is suitably constructed and arranged to determine which of the three pairs of complementary valves (1 and 4, 3, and 6, or 5 and 2) in the bridge 10 should be used for the bypass function, and when activated by a signal BP it applies 1 signals to the input terminals 118 of the inverting OR circuits 115 associated with the two firing channels in the valve firing system 20 that will produce trigger signals for the selected pair of valves.

The activating signal BP is supplied to the bypass pair selection logic circuit 87 by the bypass initiating means 85 whose function is to initiate a temporary bypass operation in certain circumstances where such operation will help the converter to survive abnormal system disturbances without a permanent shutdown. The bypass initiator 85 also produces the signal BK which normally is 1 and which is switched to a low or 0 state just prior to issuance of the activating signal BP (thereby causing the gates 112 in the firing signal logic portion of the valve firing system 20 to inhibit or block the normal cyclic pattern of valve firings before the bypass pair is activated).

Preferably the bypass initiator 85 comprises a temporary bypass sequencer having a plurality of inputs which include, for example, a bypass command XB, a commutation failure signal CF, and an undervoltage signal UV. The bypass command XB is supplied by external controls (not shown) whenever a bypass operation is desired. A commutation failure signal CF is supplied to the sequencer each time a commutation failure occurs in the bridge 10, as detected by suitable means (not shown) well known to persons skilled in this art. The undervoltage signal UV is derived from part of the commutating ability calculating means 83 which, as will be explained below, produces a 0 signal if the magnitude of the alternating voltage of the a-c network falls below a very low level. The bypass sequencer is suitably designed to issue a temporary bypass order (BK =0) whenever certain abnormal conditions are indicated by its various inputs. More specifically, the temporary bypass order is issued: (1) concurrently with the bypass command XB, (2) so long as UV is 0, or (3) for a short controlled duration (e.g., 40 milliseconds or longer) immediately following the recurrence of three commutation failure signals within a predetermined span of time (e.g., 1 second). In delayed response to the initiation of the temporary bypass order, an activating signal BP is supplied to the bypass pair selection logic circuit 87. In some circumstances, it may also be desirable to switch the protective signal X to 0 before the temporary bypass order is terminated, thereby removing the run order RO in the starting means 75 (FIG. 2). This resets the latching switch 102 and stops the run signal RS, and as a result the starting means 75 will be effective to supervise the restarting of the converter after the bypass operation is concluded.

Whenever the starting means 75 is effective, the converter is prevented from restarting if the inhibit signal CRY is in a low state. In other words, when CRY = 0 there can be no transition by the starting means from a blocking state (RS = 0) to a running state (RS = 1). In accordance with my invention, the restarting inhibit function is responsive to conditions which presage a commutation failure if the converter were allowed to start. Toward this end, the inputs to the AND logic unit 104 (which supplies the inhibit signal CRY) include the previously mentioned commutating ability signal CA which is derived from the commutating ability calculating means 83. When CA = 0, operation of the starting means 75 is inhibited. A practical embodiment of the commutating ability calculating means is shown in FIG. 3 which will now be described.

Figure 3:
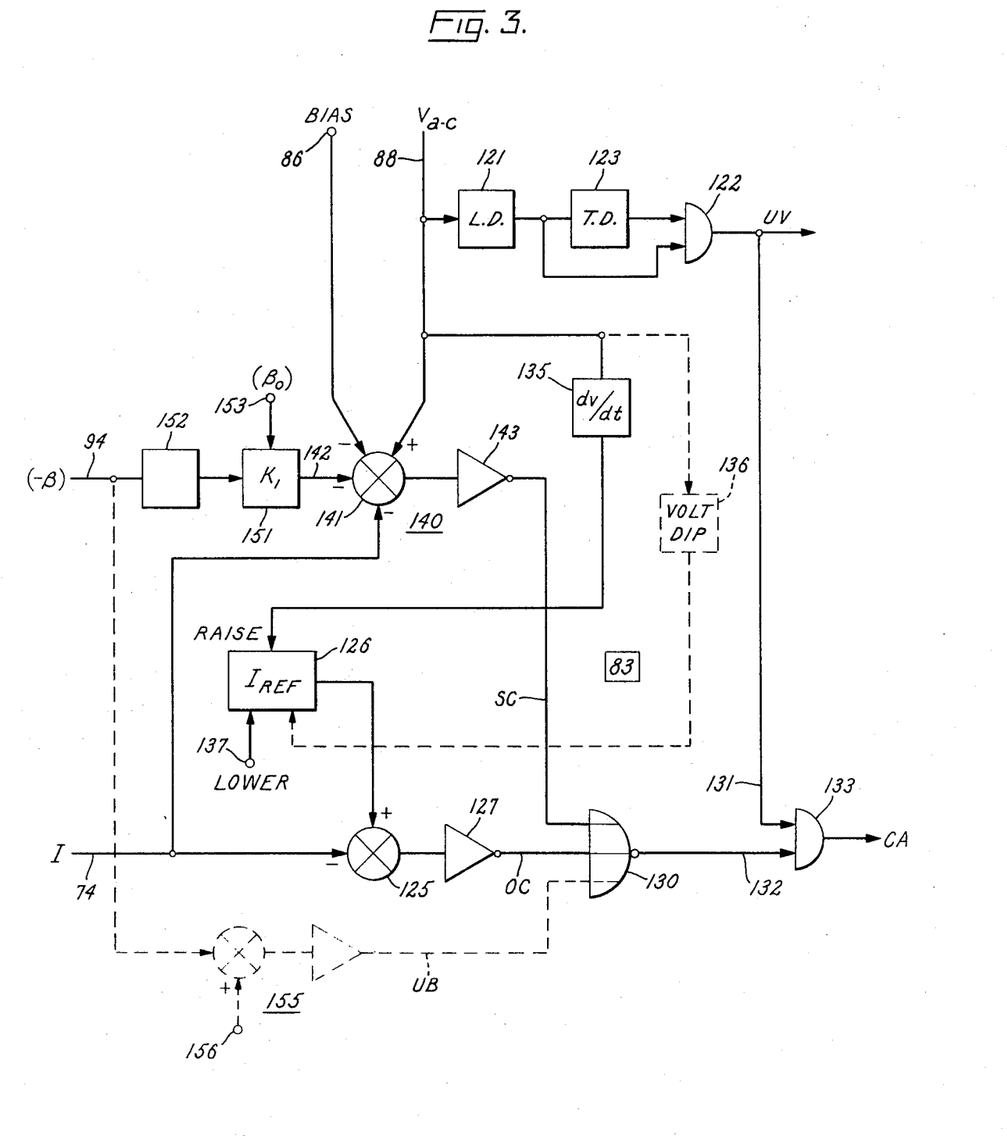
FIG. 3 is an expanded schematic diagram of the commutating ability calculating means shown as a single block in FIG. 1.

As it is shown in FIG. 3, the commutating ability calculator 83 receives four basic inputs which are respectively designated Bias, $V_{a-c}$, $-\beta$, and I. The bias input is a relatively negative signal of predetermined constant value from a suitable source shown simply as a terminal 86. The $V_{a-c}$ input is a signal representative of the voltage (E) across the a-c conductors 11A, 11B, and 11C to which the calculator is coupled by means of a lead 88 and the a-c system monitor 40 (FIG. 1). The $-\beta$ input is the firing angle feedback signal 94 from the beta selector 95 to which the calculator 83 is connected, and it is representative of the predicted magnitude of the firing angle for each consecutive firing signal 31-36 that will in turn, when the converter is running, cause the next valve firing in the normal sequence. The I input is a feedback signal which varies with the actual magnitude of current ($I_d$) in the d-c link of the power system, and it is supplied via a lead 74 from a d-c line monitor 73 which, as is shown in FIG. 1, is coupled to the conductor 12P by means of a d-c current transformer 71.

In the calculator 83, $V_{a-c}$ is the input signal for a level detector 121 which has either a 0 or a 1 output, depending on the value of $V_{a-c}$. This output is in its high or 1 state so long as $V_{a-c}$ has a value corresponding to the normal RMS magnitude (i.e., 1.0 per unit) of alternating voltage in the a-c network of the power delivery system. The level detector 121 is suitably constructed and arranged to change its output to 0 when the value of its input signal falls below a predetermined amount indicating that the magnitude of alternating voltage is under a preset minimum limit (e.g., 0.45 per unit) and to restore the output to 1 when $V_{a-c}$ subsequently rises above another predetermined amount corresponding to a higher level of alternating voltage (e.g., 0.6 per unit). The output of the level detector 121 is connected directly to one input of an AND logic unit 122 and by way of a time delay circuit 123 to the other input of the same unit. The output of the logic unit 122 is the undervoltage signal UV which switches from a 1 state to a 0 state in immediate response to the output of the level detector 121 changing from 1 to 0 and which switches from 0 to 1 states in delayed response to the output of 121 changing from 0 to 1. The delay introduced by the circuit 123, of the order of approximately 50 milliseconds, allows time for transients and distortions in the alternating voltage to dampen out after the voltage returns to normal. The undervoltage signal UV is supplied to the bypass initiating means 85 (FIG. 1) and also to a first input 131 of an AND logic unit 133 in the calculator 83.

The I input to the commutating ability calculator 83 is the input signal for level detecting means comprising a summing point 125, a source 126 of a current reference signal, and an inverting amplifier 127. The values of both the current feedback signal I and the current reference signal are compared at the summing point 125, and the polarity of their difference determines the state of an output signal OC of the amplifier 127. The current reference signal has a predetermined magnitude corresponding to a desired maximum limit of the direct current in the d-c conductor 12P. Normally this limit is preset, by way of example, at 1.5 times the rated full-load magnitude of $I_d$, and preferably the source 126 includes suitable means (not shown) for adjusting the reference magnitude if and to the extent desired. The output signal OC of the amplifier 127 is in a low or 0 state whenever the value of I is less than the amount of the reference signal, and it is in a 1 state whenever I exceeds that amount. This output energizes a NOR logic unit 130 whose output signal is supplied to the second input 132 of the AND logic unit 133. The input 132 will therefore be 0 whenever OC = 1 due to the magnitude of direct current in the power system being over the maximum limit determined by the current reference 126.

The output of the AND logic unit 133 is the commutating ability signal CA. This signal is in a low or 0 state so long as there is a 0 signal at either of the inputs 131 or 132, and it is 1 only when both of the input signals are 1. In the manner hereinbefore described, operation of the starting means 75 is inhibited if CA = 0.

In a gross form of my invention, the previously described a-c undervoltage signal UV and d-c overcurrent signal OC accomplish the desired result of preventing starting or restarting of the converter when the commutating ability is insufficient to ensure successful commutation if the converter were running. This is because a converter is usually most susceptible to commutation failure when there has been a large reduction in alternating voltage or a large increase in direct current. The respective minimum and maximum limits of these parameters are ordinarily preset so as to include an ample margin of safety. In some situations, however, it may be desirable to vary the maximum limit of current or to modify the minimum limit of voltage. For example, if the alternating voltage (E) were rapidly increasing, the maximum limit of $I_d$ could safely be raised without risking a commutation failure on starting, and for this purpose I have shown in FIG. 3 a means 135 connected between the lead 88 and the current reference signal source 126 for incrementally adjusting the magnitude of the current reference signal in response to the RMS magnitude of E increasing faster than a predetermined time rate of change. On the other hand, if a dip in the magnitude of alternating voltage were detected, the maximum limit of $I_d$ should be lowered to ensure a safe margin for commutation on starting, and for this purpose suitable means 136 can be connected between the lead 88 and the source 126 for decrementally adjusting the current reference signal in response to E decreasing below a predetermined level. The means for lowering the current reference signal magnitude can also be actuated by an external signal applied to a terminal 137 in the event of an abnormal loss of VARs in the a-c system to which the converter is connected. Similarly the threshold level of the undervoltage responsive level detector 121 could be modified as a function of the system VAR supply to increase the minimum alternating voltage and thereby further inhibit restarting in the event of a subnormal VAR supply.

In a further refinement of my invention, the commutating ability can be more precisely calculated by utilizing the inverter commutation equation set forth in the introductory portion of this specification. Toward this end, suitable means 140 is provided for feeding to the second input of the NOR logic unit 130 a signal SC which is in a 1 state whenever the ratio of $I_d$ to E is greater than $k$ $(\cos [\beta - \gamma] - \cos \beta)$, where $k$ is a constant equal to $1/\sqrt{2} \omega L$. The 1 state of the signal SC means that the commutation equation is not satisfied and that the converter has insufficient ability to commutate if it were allowed to start. So long as either SC or OC is 1, the signal that the unit 130 supplies to the input 132 of the AND logic unit 133 is 0, and in this event the commutating ability signal CA is 0 which inhibits operation of the starting means 75 as previously explained.

To calculate the commutating ability in accordance with the commutation equation, the means 140 is supplied with both the direct current feedback signal I and the alternating voltage derived signal $V_{a-c}$, and it also needs to be supplied with a signal representative of the quantity $\cos [\beta - \gamma] - \cos\beta$.

The latter signal can be derived from the firing angle feedback signal 94 by means of a suitable function generator. For the sake of simplification, the commutation angle $\gamma$ can be assumed to be relatively constant, in which case the aforesaid quantity reduces to $K\cos(\beta + \theta)$ and a cosine function generator can be used. Mechanical devices and electronic or static circuits well suited for this purpose are known in the art.

A further simplified version of the means 140 has been specifically illustrated in FIG. 3. In this form of my invention the means 140 comprises a summing point 141 to which the I and $V_{a-c}$ signals are supplied with the relative polarities shown. In addition, the summing point 141 is supplied with a negative bias signal from the terminal 86 and with a positive signal 142 which varies with the firing angle feedback signal when $-\beta$ is at least as large as a predetermined threshold angle (e.g., 20°). Preferably the signal 142 is derived from the firing angle feedback signal 94 by means of a non-inverting amplifier 151 having a gain of $K_1$ and an input network 152 whose transfer function is of the form $1/1 + \tau_1 s$. The threshold level of response of the amplifier 151 is set by suitable means (illustrated symbolically by the terminal 153) so that the value of the signal 142 is zero whenever the firing angle is smaller than the aforesaid threshold angle.

The relative values of the four signals which are supplied to the summing point 141 are there compared, and their algebraic sum serves as an input signal to an inverting amplifier 143. So long as the polarity of this sum is relatively positive, the output signal (SC) of the amplifier 143 is in a low or 0 state, and otherwise it is 1. Consequently SC = 1 whenever the sum of the current feedback signal I and the bias signal is greater than the sum of the alternating voltage signal $V_{a-c}$ and the signal 142. The value of the bias signal is chosen to equal the value that the signal 142 has whenever $\beta$ is equal to the predetermined threshold angle ($\beta_o$), and the relevant proportionality constants are chosen so that $V_{a-c}/E = I/I_d \, k(\cos [\beta_o - \gamma_o] - \cos\beta_o)$, where $\gamma_o$ is the assumed constant commutation angle. As $\beta$ increases from its threshold angle to approximately 50°, the resulting increase in the value of the signal 142 will be approximately proportional to $\cos(\beta + \theta)$, and the gain $K_1$ of the amplifier 151 is chosen so that the illustrated means 140 performs its commutating ability calculating function with an increasing margin of safety. By increasing margin of safety I mean an increasing possibility that as $\beta$ increases the means 140 will indicate insufficient commutating ability (SC = 1) in response to some system conditions which in fact are favorable for commutation.

In the scheme just described, the signal 142 is zero whenever $\beta$ is smaller than $\beta_o$, and in this event the output signal SC of the means 140 will ordinarily be 1 and the commutating ability signal CA will be 0. As an alternative way of establishing a minimum firing angle limit, FIG. 3 illustrates a level detector 155 which is supplied with the firing angle feedback signal 94 and which feeds to a third input of the NOR logic unit 130 a signal UB which is in a 1 state whenever the feedback signal 94 is lower than the magnitude of a predetermined reference signal derived from a terminal 156. It should be noted that this aspect of my invention is particularly useful where the initial firing angle prior to starting is not biased according to the above-referenced Leete patent.

While I have shown and described a practical form of my invention by way of illustration, further modifications will occur to those skilled in the art. I therefore contemplate by the claims which conclude this specification to cover all such modifications as fall within the true spirit and scope of my invention.

What I claim as new and desire to secure by Letters Patent of the United States is:

1. For automatically starting or restarting an HVDC electric power converter comprising a plurality of controllable electric valves connected in a bridge configuration between first and second sets of power conductors, said first set of conductors being associated with a polyphase alternating voltage network and said second set being adapted to conduct direct current which periodically is commutated from one valve to another upon firing said valves in a predetermined normal sequence during each cycle of alternating voltage when the converter is running, said converter including means for cyclically firing said valves in said sequence and at a firing angle that can vary within a permissible range as a function of a variable control signal, the improvement comprising:

a. blocking means effective when not disabled for causing the firing means to idle, in which state said cyclic valve firings are suspended;

b. starting means operative in response to certain conditions for disabling said blocking means, whereupon said firing means is allowed to start or to restart the converter; and c. means coupled to said first and second sets of conductors and to said firing means for calculating the commutating ability of the converter and for inhibiting operation of said starting means if said commutating ability is insufficient to ensure successful commutation once the converter is running.

2. The improvement of claim 1 in which said certain conditions include the execution of a run order.

3. The improvement of claim 2 in which said blocking means is effective in response to the presence of a bypass order for causing the firing means to idle, and in which said certain conditions include the absence of said bypass order.

4. The improvement of claim 1 in which said means for calculating commutating ability is responsive to the relative magnitudes of a combination of parameters comprising said alternating voltage ($e$), said direct current ($I_d$), and said firing angle ($\beta$).

5. The improvement of claim 4 in which said means for calculating commutating ability is constructed and arranged to inhibit operation of said starting means when the ratio of $I_d$ to E is greater than $k(\cos[\beta - \gamma] - \cos \beta)$, where $k$ is a predetermined constant and $\gamma$ is the commutation angle.

6. The improvement of claim 1 in which said means for calculating commutating ability is constructed and arranged to inhibit operation of said starting means when either the commutating ability is insufficient or the magnitude of alternating voltage is under a predetermined mimimum limit.

7. The improvement of claim 1 in which said means for calculating commutating ability is constructed and arranged to inhibit operation of said starting means whenever the commutating ability is insufficient or the magnitude of direct current is over a predetermined maximum limit.

8. The improvement of claim 7 in which said means for calculating commutating ability is constructed and arranged additionally to inhibit operation of said starting means when the magnitude of alternating voltage is under a predetermined minimum limit.

9. The improvement of claim 1 in which said means for calculating commutating ability is constructed and arranged to inhibit operation of said starting means whenever the magnitude of direct current is over a maximum limit which is determined by an adjustable reference signal.

10. The improvement of claim 9 further comprising means coupled to said first set of conductors for adjusting said reference signal so as to raise said maximum limit in response to the alternating voltage increasing in magnitude faster than a predetermined rate of change.

11. The improvement of claim 9 further comprising means coupled to said first set of conductors for adjusting said reference signal so as to lower said maximum limit in response to the magnitude of alternating voltage decreasing below a predetermined level.

12. The improvement set forth in claim 1 for automatically starting or restarting a converter whose firing means comprises (i) a firing time computer for producing during each cycle of alternating voltage a family of periodic output signals whose timing, relative to recurrent reference points in said cycle, is determined by said control signal, and (ii) a valve firing system activated by the respective output signals of said family for firing said valves in said predetermined normal sequence, wherein said blocking means is connected between said firing time computer and said valve firing system and is effective when not disabled for preventing activation of said valve firing system by said output signals.

13. The improvement set forth in claim 12 in which said certain conditions include the coincidence of a run order and the leading edge of any one of said output signals.

14. The improvement of claim 12 in which said means for calculating commutating ability is constructed and arranged to inhibit operation of said starting means when either the magnitude of alternating voltage is under a predetermined minimum limit or the timing of said output pulses corresponds to a firing angle smaller than a predetermined magnitude.

15. The improvement of claim 12 further comprising means for supplying a first signal representative of said direct current and a second signal representative of said alternating voltage to said means for calculating commutating ability, and in which said firing time computer includes means for supplying to said calculating means a feedback signal representative of the predicted magnitude of the firing angle for each consecutive output signal that will in turn, when said blocking means is disabled, cause the next valve firing in said predetermined normal sequence, and in which said calculating means is responsive to the relative values of said first and second signals and of a third signal which approximates a cosine function of said feedback signal.

16. The improvement of claim 15 in which said calculating means is constructed and arranged to inhibit operation of said starting means whenever the commutating ability is insufficient or the value of said first signal exceeds a predetermined amount or the value of said second signal is less than another predetermined amount.

17. For automatically starting or restarting an HVDC electric power converter comprising a plurality of controllable electric valves connected in a bridge configuration between first and second sets of power conductors, said first set of conductors being associated with a polyphase alternating voltage network and said second set being adapted to conduct direct current which periodically is commutated from one valve to another upon firing said valves in a predetermined normal sequence during each cycle of alternating voltage when the converter is running, said converter including means for cyclically firing said valves in said sequence and at a firing angle ($\beta$) that can vary within a permissible range as a function of a variable control signal, the improvement comprising:

a. blocking means effective when not disabled for causing the firing means to idle, in which state said cyclic valve firings are suspended;

b. starting means operative in response to certain conditions for disabling said blocking means, whereupon said firing means is allowed to start or to restart the converter;

c. means coupled to said second set of conductors for producing a first signal representative of the magnitude of said direct current;

d. means coupled to said first set of conductors for producing a second signal representative of the magnitude of said alternating voltage;

e. means associated with said firing means and operative when said firing means is idling and when β is at least as large as a predetermined threshold angle for producing a third signal which varies with the predicted magnitude of β for each consecutive valve firing in said predetermined normal sequence, the value of said third signal being zero whenever β is smaller than said threshold angle; and f. means supplied with said first, second, and third signals for inhibiting operation of said starting means whenever
   i. the sum of said first signal and a predetermined bias signal is greater than the sum of said second and third signals, or
   ii. the value of said first signal exceeds a predetermined amount, or
   iii. the value of said second signal is less than another predetermined amount.

18. For automatically starting or restarting an HVDC electric power converter comprising a plurality of controllable electric valves connected in a bridge configuration between first and second sets of power conductors, said first set of conductors being associated with a polyphase alternating voltage network and said second set being adapted to conduct direct current which periodically is commutated from one valve to another upon firing said valves in a predetermined normal sequence during each cycle of alternating voltage when the converter is running, said converter including means for cyclically firing said valves in said sequence and at a firing angle that can vary within a permissible range as a function of a variable control signal, the improvement comprising:

a. means effective when not disabled for blocking said cyclic valve firings;

b. starting means operative in response to certain conditions for disabling said blocking means, whereupon the firing means is allowed to start or to restart the converter; and c. means coupled to said first and second sets of conductors for inhibiting operation of said starting means if the magnitude of alternating voltage is under a predetermined minimum limit or if the magnitude of direct current is over a predetermined maximum limit.

19. The improvement of claim 18 further comprising means associated with said firing means and operative when said cyclic valve firings are blocked for monitoring the predicted firing angle (β) for each consecutive valve firing in said predetermined normal sequence, wherein said inhibiting means is also connected to said firing angle monitoring means and is constructed and arranged to inhibit operation of said starting means if the magnitude of alternating voltage is under a predetermined mimimum limit of if the magnitude of direct current is over a predetermined maximum limit or if β is smaller than a predetermined magnitude.

20. A method of starting or restarting a converter in an HVDC electric power delivery system, said converter comprising a plurality of controllable electric valves connected in a bridge configuration between a-c and d-c electric power conductors, comprising the steps of:

a. cyclically generating a family of staggered output signals adapted to activate a valve firing system for turning on the respective valves of the bridge in a predetermined normal sequence in timed relation to the alternating voltage across said a-c conductors;

b. responding to a run order by permitting said output signals to activate said valve firing system;

c. monitoring the magnitudes of said alternating voltage, of the direct current in said d-c conductors, and of the firing angle that characterizes said output signals;

d. calculating from the monitored magnitudes of said alternating voltage, direct current, and firing angle the ability of the converter to commutate said direct current once the converter is running; and e. inhibiting said activation permitting step so long as the calculated commutating ability is insufficient to ensure successful commutation.

* * * * *